(12) United States Patent
Mizusaki et al.

(10) Patent No.: US 6,852,374 B2
(45) Date of Patent: Feb. 8, 2005

(54) LIQUID CRYSTAL DISPLAY DEVICE, OPTICAL ELEMENT, METHOD OF FABRICATING THE LIQUID CRYSTAL DISPLAY DEVICE AND METHOD OF MAKING THE OPTICAL ELEMENT

(75) Inventors: Masanobu Mizusaki, Tenri (JP); Tadashi Kawamura, Tenri (JP); Akiyoshi Fujii, Nara (JP); Yuichiro Yamada, Nagoya (JP)

(73) Assignee: Sharp Kabushiki Kaisha, Osaka (JP)

( * ) Notice: Subject to any disclaimer, the term of this patent is extended or adjusted under 35 U.S.C. 154(b) by 247 days.

(21) Appl. No.: 10/232,651

(22) Filed: Sep. 3, 2002

(65) Prior Publication Data

US 2003/0113484 A1 Jun. 19, 2003

(30) Foreign Application Priority Data

Sep. 11, 2001 (JP) ........................................ 2001-274592

(51) Int. Cl.[7] ............................................. G02F 1/1337
(52) U.S. Cl. ..................... 428/1.2; 427/163.3; 349/123; 349/124; 349/129; 349/130; 349/134; 349/135; 349/136; 359/494
(58) Field of Search ................. 428/1.1–1.2, 1.23–1.28; 427/163.3; 349/123–124, 129–130, 134–136; 359/464; 522/35, 164

(56) References Cited

U.S. PATENT DOCUMENTS 5,604,615 A * 2/1997 Iwagoe et al. ............... 349/124

6,535,260 B1 * 3/2003 Tasaka et al. ............... 349/124

FOREIGN PATENT DOCUMENTS

| EP | 0 965 876 A2 | 12/1999 |
| JP | 11-007018 | 1/1999 |
| JP | 11-271759 | 10/1999 |
| JP | 11-311788 | 11/1999 |
| JP | 2001-290153 | 10/2001 |
| JP | 1 179 863 A2 * | 2/2002 |

OTHER PUBLICATIONS

Nagae et al., SID 2000 pp. 26–29 (cited in [0008], p. 4 of the specification).

* cited by examiner

Primary Examiner—Harold Pyon
Assistant Examiner—Sow-Fun Hon
(74) Attorney, Agent, or Firm—Nixon & Vanderhye, P.C.

(57) ABSTRACT

A liquid crystal display device includes two substrates, a liquid crystal layer sandwiched between the substrates and two alignment films, each being provided on one surface of associated one of the substrates so as to face the liquid crystal layer. The device defines multiple picture elements. At least one of the two alignment films is made of a polymer material that includes a main chain, an atomic group having a bond that is selectively cut when exposed to an actinic ray and a side chain bonded to the main chain via the atomic group. The polymer material with the side chain can give a pretilt angle of greater than 85 degrees but 90 degrees or less to liquid crystal molecules. The polymer material without the side chain can give a pretilt angle of 2 degrees to 15 degrees to the liquid crystal molecules.

20 Claims, 4 Drawing Sheets

LIQUID CRYSTAL DISPLAY DEVICE, OPTICAL ELEMENT, METHOD OF FABRICATING THE LIQUID CRYSTAL DISPLAY DEVICE AND METHOD OF MAKING THE OPTICAL ELEMENT

BACKGROUND OF THE INVENTION

1. Field of the Invention

The present invention relates to a liquid crystal display device (LCD), an optical element, a method of fabricating the LCD and a method of making the optical element. The present invention also relates to a material of a liquid crystal alignment film that can be used effectively in the LCD or the optical element.

2. Description of the Related Art

LCDs are used extensively today in portable telecommunications units such as cell phones, personal computers, word processors, amusement appliances, flat panel displays for TV sets, for example, and display boards, windows, doors and walls by utilizing the optical shuttering effects of their liquid crystal layer.

An LCD conducts a display operation by utilizing the optical anisotropy of its liquid crystal molecules. Accordingly, in an LCD, the orientation directions of the liquid crystal molecules are controlled. The orientation directions of liquid crystal molecules may be controlled by any of various techniques depending on the display mode (e.g., TN mode) of the LCD. Normally, the orientation directions of liquid crystal molecules are controlled by using at least one alignment film.

An alignment film has often been either a film of a polymer material such as polyimide or polyvinyl alcohol that had been subjected to be rubbing treatment or a silicon dioxide film deposited by an oblique evaporation process. Among other things, a polyimide film that has been subjected to a rubbing treatment is normally used today as an alignment film. This is because the rubbing technique contributes effectively to mass production and because polyimide is more stabilized chemically (i.e., resulting in a relatively small amount of impurities mixing into the liquid crystal layer) than any other candidate material.

Figure 7A:
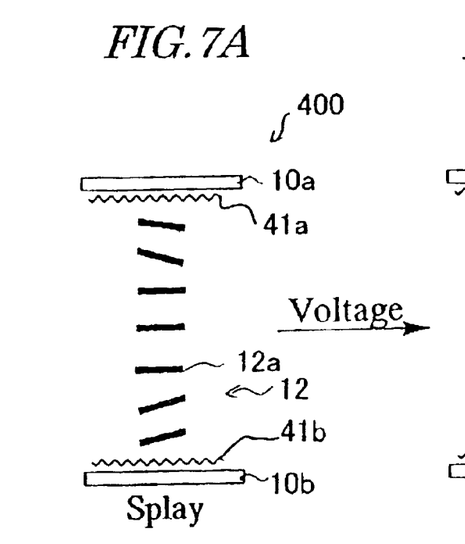
FIGS. 7A and 7B schematically illustrate how liquid crystal molecules are oriented in an OCB-mode LCD while no voltage is applied thereto and while a voltage of Vcr or more is applied thereto, respectively.
Figure 7B:
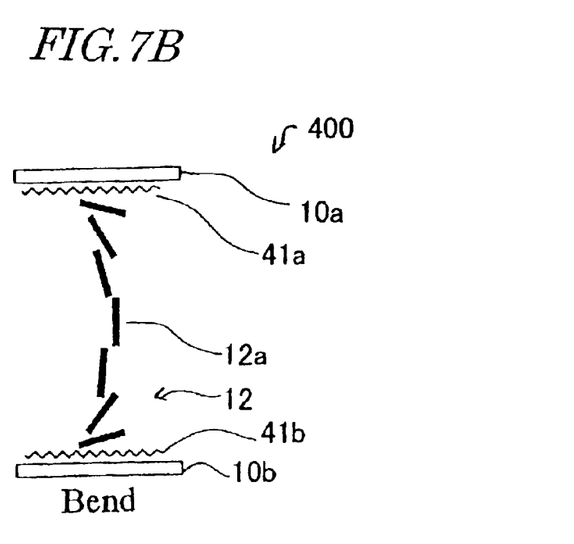

Recently, to meet high demands for development of high-response-speed liquid crystal displays, various orientation modes have been proposed as alternatives to the conventional twisted nematic (TN) mode. Among other things, an optically compensated birefringence (OCB) mode has been researched and developed particularly vigorously as an orientation mode promising high response speed. FIGS. 7A and 7B schematically show exemplary structures of an LCD 400 operating in the OCB mode (which will be herein referred to as an "OCB-mode LCD"). Although not shown in FIG. 7A or 7B, an OCB-mode LCD normally further includes an element for compensating for a phase difference (see Japanese Laid-Open Publication No. 11-271759, for example).

In the OCB-mode LCD 400, the orientation states of its liquid crystal molecules 12a (of a liquid crystal material having positive dielectric anisotropy) are controlled by alignment films 41a and 41b, which are provided on the inside surfaces of two substrates 10a and 10b so as to be in contact with a liquid crystal layer 12, while no voltage is being applied to the liquid crystal layer 12. In that situation, the liquid crystal molecules 12a exhibit a splay orientation state as shown in FIG. 7A. On the other hand, when a voltage that is equal to or higher than a certain voltage Vcr is applied from electrodes (not shown) on the inside surfaces of the substrates 10a and 10b to the liquid crystal layer 12, the liquid crystal molecules 12a exhibit a bend orientation state as shown in FIG. 7B. The LCD 400 can conduct a display operation at a response speed of several milliseconds while the liquid crystal molecules 12a are exhibiting the bend orientation state.

In the OCB-mode LCD 400, however, it is difficult to make all liquid crystal molecules 12a change from the splay orientation state into the bend orientation state uniformly over the entire display area.

It is known that the probability of occurrence of this transition is closely correlated to the pretilt angle (see N. Nagae et al., "A novel method for high speed transition from splay to bend alignment in the OCB-mode LCD with fast response", IDRC 2000, p. 26, for example). Specifically, if liquid crystal molecules have a pretilt angle of less than 45 degrees, the splay orientation state has a lower Gibbs free energy and is more stabilized than the bend orientation state. On the other hand, when the pretilt angle exceeds 45 degrees, the bend orientation state is more stabilized than the splay orientation state. In the splay orientation state, the smaller the pretilt angle of liquid crystal molecules, the less likely the liquid crystal molecules change into the bend orientation state. Accordingly, in such a situation, a high voltage needs to be applied to the liquid crystal layer to make the liquid crystal molecules change into the bend orientation state.

To make the liquid crystal molecules change into the bend orientation state at a lower voltage more easily, a method of providing a high pretilt angle region for a non-display area on a substrate was proposed. According to this method, the liquid crystal molecules are given a greater pretilt angle in the non-display area than in the display area on the same substrate. In that case, the liquid crystal molecules in the non-display area (i.e., the high pretilt angle region) change into the bend orientation state responsive to a lower voltage applied than the liquid crystal molecules in the display area (i.e., a low pretilt angle region). And those liquid crystal molecules that have changed into the bend orientation state in the high pretilt angle region can be used as cores for making the liquid crystal molecules in the low pretilt angle region change into the bend orientation state more easily.

For example, according to the method disclosed in Japanese Laid-Open Publication No. 2000-75299, the high pretilt angle region is formed by using a vertical alignment film and the low pretilt angle region is formed by using a horizontal alignment film. That is to say, by selectively coating a portion of the surface of a substrate with a different alignment film material from that applied to the remaining portion of the substrate surface, the high and low pretilt angle regions can be formed. Also, Japanese Patent Application No. 2000-107910 discloses a method of forming a horizontal alignment region in a portion of a vertical alignment film by exposing that portion of the vertical alignment film to an ultraviolet ray having a wavelength of 245 nm (which will be herein referred to as a "deep UV ray").

Not only the OCB-mode LCDs but also LCDs operating in a hybrid aligned nematic (HAN) mode, which is one of the electrically controlled birefringence (ECB) modes, have been researched vigorously. An LCD operating in the HAN mode will be herein referred to as an "HAN-mode LCD". The HAN-mode LCD utilizes a hybrid orientation state of liquid crystal molecules. Accordingly, compared to a TN-mode LCD utilizing the twisted orientation state of liquid crystal molecules, the HAN-mode LCD excels in high speed response. In addition, unlike the OCB-mode LCD, the HAN-mode LCD need not make the liquid crystal molecules change from the splay orientation state into the bend orientation state. Accordingly, the HAN mode is expected to be a display mode that contributes to driving the LCD at a low applied voltage.

Figure 8:
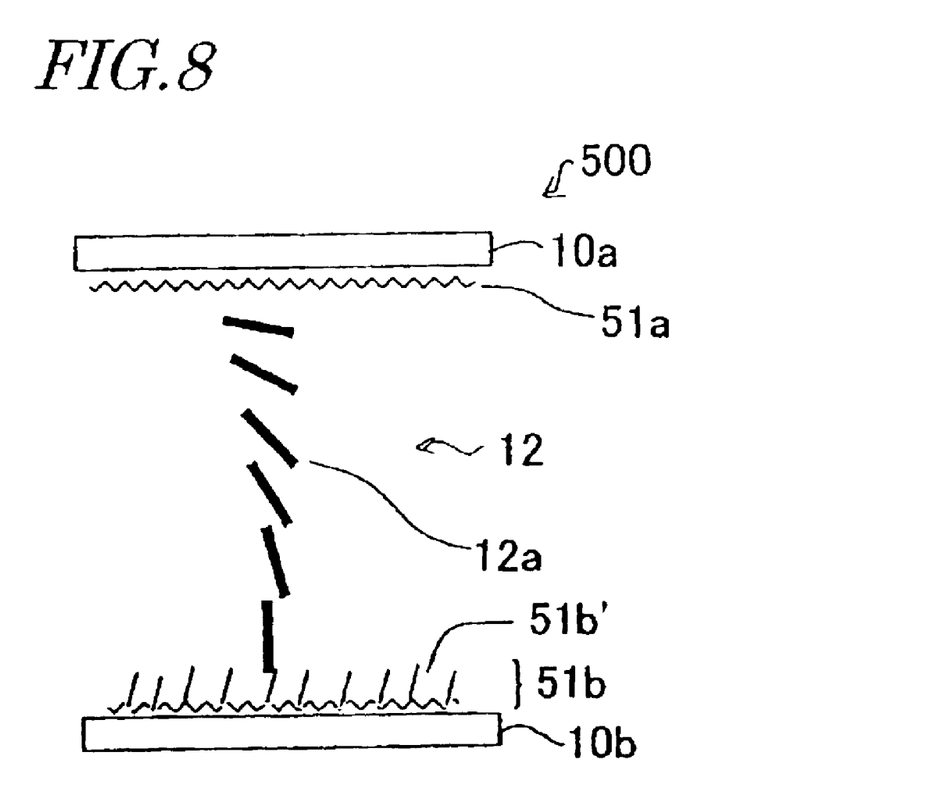
FIG. 8 schematically illustrates how liquid crystal molecules are oriented in an HAN-mode LCD.

FIG. 8 schematically shows a structure for an HAN-mode LCD 500. In the HAN-mode LCD 500, a horizontal alignment film 51$a$ is provided on the surface of one substrate 10$a$ so as to face a liquid crystal layer 12, while a vertical alignment film 51$b$ is provided on the surface of the other substrate 10$b$ so as to also face the liquid crystal layer 12. As schematically illustrated in FIG. 8, the vertical alignment film 51$b$ includes side chains (i.e., vertical alignment components) 51$b'$ that extend approximately along a normal to the surface of the substrate 10$b$.

If the horizontal and vertical alignment films 51$a$ and 51$b$ are made of different materials, then the films 51$a$ and 51$b$ will exhibit mutually different electrical characteristics (e.g., polarizations). Accordingly, while the LCD is driven by applying a voltage to the liquid crystal layer 12, charges are stored in the alignment film(s) 51$a$ and 51$b$. In that case, a so-called "DC offset voltage" is generated responsive to the voltage applied to the liquid crystal layer 12. As a result, the image to be displayed is sometimes not refreshed, thus causing a so-called "image persistence" problem.

To overcome a problem like this, Japanese Laid-Open Publication No. 11-311788 discloses a method of forming a horizontal alignment film by subjecting a vertical alignment film to a horizontal alignment process. This publication discloses an exemplary horizontal alignment process in which the vertical alignment film is exposed to a polarizing ultraviolet ray that falls within the wavelength range of 230 nm to 400 nm at a radiation energy of 10 J/cm$^2$ to 20 J/cm$^2$. The ultraviolet ray preferably falls within the wavelength range of 240 nm to 330 nm according to the publication.

The conventional methods described above, however, have the following drawbacks.

As for the OCB-mode LCD fabricating method disclosed in Japanese Laid-Open Publication No. 2000-75299 in which the high and low pretilt angle regions are made of dissimilar materials on the surface of one substrate so as to face the liquid crystal layer, the process steps of applying and patterning the additional alignment film material should be performed, thus increasing the number of manufacturing process steps required and decreasing the throughput.

Also, the present invention discovered and confirmed via experiments that the method of forming a horizontal alignment region by exposing a vertical alignment film to an ultraviolet ray having a wavelength of 245 nm as disclosed in Japanese Patent Application No. 2000-107910 created instability in the orientation state (e.g., the magnitude of the pretilt angle) of the horizontal alignment region. A similar problem also happened even when a vertical alignment film was exposed to a polarizing ultraviolet ray as disclosed in Japanese Laid-Open Publication No. 11-311788.

SUMMARY OF THE INVENTION

In order to overcome the problems described above, an object of the present invention is to improve the performance and increase the productivity of a liquid crystal display device of the type including a high pretilt angle region (i.e., vertical alignment region) and a low pretilt angle region (i.e., a horizontal alignment region) such as the OCB-mode LCD and the HAN-mode LCD described above.

Another object of the present invention is to provide a material of a liquid crystal alignment film that can be used effectively to form the high and low pretilt angle regions with high stability and efficiency and an optical element made of such a material.

A preferred embodiment of the present invention provides a liquid crystal display device. The liquid crystal display device preferably includes two substrates, a liquid crystal layer that is sandwiched between the two substrates, and two alignment films. Each of the alignment films is preferably provided on one surface of associated one of the substrates so as to face the liquid crystal layer. The liquid crystal display device preferably defines multiple picture elements. In this device, at least one of the two alignment films is preferably made of a polymer material. The polymer material preferably includes a main chain, an atomic group having a bond that is selectively cut when exposed to an actinic ray, and a side chain that is bonded to the main chain by way of the atomic group. The polymer material with the side chain is preferably able to give a pretilt angle of greater than 85 degrees but 90 degrees or less to liquid crystal molecules of the liquid crystal layer. The polymer material without the side chain is preferably able to give a pretilt angle of 2 degrees to 15 degrees to the liquid crystal molecules.

In one preferred embodiment of the present invention, at least one of the two alignment films preferably includes a low pretilt angle region that is made of the polymer material without the side chain. The at least one alignment film may further include a high pretilt angle region that is made of the polymer material with the side chain.

In this particular preferred embodiment, each of the two alignment films may include the high pretilt angle region and the low pretilt angle region. In that case, the liquid crystal layer preferably includes: a bend region, which is located between the high pretilt angle regions of the alignment films and in which the liquid crystal molecules exhibit a bend orientation state while no voltage is applied thereto; and a splay region, which is located between the low pretilt angle regions of the alignment films and in which the liquid crystal molecules exhibit a splay orientation state while no voltage is applied thereto. In this preferred embodiment, the liquid crystal display device preferably conducts a display operation by utilizing the bend orientation state. A display mode utilizing the bend orientation state is preferably an OCB mode.

In an alternative preferred embodiment, one of the two alignment films may include the high pretilt angle region and the other alignment film may include the low pretilt angle region. In that case, the liquid crystal layer preferably includes a hybrid region, which is located between the high and low pretilt angle regions of the two alignment films and in which the liquid crystal molecules exhibit a hybrid orientation state. In this preferred embodiment, the liquid crystal display device preferably conducts a display operation in an HAN mode.

In still another preferred embodiment, the bond of the atomic group is preferably cut when exposed to a radiation that falls within the wavelength range of 300 nm to 450 nm. More preferably, the bond is cut when exposed to a radiation that falls within the wavelength range of 350 nm to less than 400 nm.

In this particular preferred embodiment, the atomic group preferably includes at least one compound that is selected from the group consisting of benzoyl peroxide, benzoyl ether and derivatives thereof.

Another preferred embodiment of the present invention provides a method of fabricating a liquid crystal display device that includes two substrates, a liquid crystal layer that is sandwiched between the two substrates and two alignment films, each of which is provided on one surface of associated one of the substrates so as to face the liquid crystal layer. The liquid crystal display device preferably defines multiple picture elements. The method preferably includes the steps of preparing the two substrates and forming at least one of the two alignment films of a polymer material on the surface of at least one of the two substrates. The polymer material preferably includes a main chain, an atomic group having a bond that is selectively cut when exposed to an actinic ray, and a side chain that is bonded to the main chain by way of the atomic group. The polymer material with the side chain preferably gives a pretilt angle of greater than 85 degrees but 90 degrees or less to liquid crystal molecules of the liquid crystal layer. The method preferably further includes the steps of exposing at least one region of the alignment film to the actinic ray, thereby cutting the bond of the atomic group of the polymer material in the at least one region and removing the side chain, and forming the liquid crystal layer that includes liquid crystal molecules to which a pretilt angle of 2 degrees to 15 degrees has been given by the at least one region of the alignment film.

In one preferred embodiment of the present invention, the exposing step preferably includes the step of exposing selected regions of the alignment film, which are to define the multiple picture elements, to the actinic ray. The step of forming the liquid crystal layer preferably includes the step of forming the liquid crystal layer that includes liquid crystal molecules to which a pretilt angle of greater than 85 degrees but 90 degrees or less has been given by the other non-selected regions of the alignment film that have not been exposed to the actinic ray.

In another preferred embodiment of the present invention, the exposing step preferably includes the step of exposing the at least one region to a radiation that falls within the wavelength range of 300 nm to 450 nm. More preferably, the exposing step includes the step of exposing the at least one region to a radiation that falls within the wavelength range of 350 nm to less than 400 nm.

In still another preferred embodiment, the atomic group preferably includes at least one compound that is selected from the group consisting of benzoyl peroxide, benzoyl ether and derivatives thereof.

Still another preferred embodiment of the present invention provides an optical element. The optical element preferably includes two alignment films and a birefringence medium layer that is sandwiched between the two alignment films. In the optical element, the birefringence medium layer preferably includes liquid crystal molecules of which the orientation state is regulated by the two alignment films. At least one of the two alignment films is preferably made of a polymer material. The polymer material preferably includes a main chain, an atomic group having a bond that is selectively cut when exposed to an actinic ray, and a side chain that is bonded to the main chain by way of the atomic group. The polymer material with the side chain is preferably able to give a pretilt angle of greater than 85 degrees but 90 degrees or less to the liquid crystal molecules. The polymer material without the side chain is preferably able to give a pretilt angle of 2 degrees to 15 degrees to the liquid crystal molecules.

In one preferred embodiment of the present invention, at least one of the two alignment films preferably includes a low pretilt angle region that is made of the polymer material without the side chain. The at least one alignment film may further include a high pretilt angle region that is made of the polymer material with the side chain.

In this particular preferred embodiment, each of the two alignment films may include the high pretilt angle region and the low pretilt angle region. In that case, the birefringence medium layer preferably includes a first region that is located between the high pretilt angle regions of the alignment films and a second region that is located between the low pretilt angle regions of the alignment films. The first and second regions preferably have mutually different retardations.

Yet another preferred embodiment of the present invention provides a method of making an optical element that includes two alignment films and a birefringence medium layer that is sandwiched between the two alignment films. The method preferably includes the step of forming at least one of the two alignment films of a polymer material. The polymer material preferably includes a main chain, an atomic group having a bond that is selectively cut when exposed to an actinic ray, and a side chain that is bonded to the main chain by way of the atomic group. The polymer material with the side chain preferably gives a pretilt angle of greater than 85 degrees but 90 degrees or less to liquid crystal molecules of the birefringence medium layer. The method preferably further includes the step of exposing at least one region of the alignment film to the actinic ray, thereby cutting the bond of the atomic group of the polymer material in the at least one region and removing the side chain. The method preferably further includes the step of forming the birefringence medium layer that includes liquid crystal molecules to which a pretilt angle of 2 degrees to 15 degrees has been given by the at least one region of the alignment film.

In one preferred embodiment of the present invention, the exposing step preferably includes the step of exposing selected regions of the alignment film to the actinic ray. The step of forming the birefringence medium layer preferably includes the step of forming the birefringence medium layer that includes liquid crystal molecules to which a pretilt angle of greater than 85 degrees but 90 degrees or less has been given by the other non-selected regions of the alignment film that have not been exposed to the actinic ray.

In another preferred embodiment of the present invention, the exposing step preferably includes the step of exposing the at least one region to a radiation that falls within the wavelength range of 300 nm to 450 nm. More preferably, the exposing step includes the step of exposing the at least one region to a radiation that falls within the wavelength range of 350 nm to less than 400 nm.

In still another preferred embodiment, the atomic group preferably includes at least one compound that is selected from the group consisting of benzoyl peroxide, benzoyl ether and derivatives thereof.

Yet another preferred embodiment of the present invention provides a material of a liquid crystal alignment film. The material is preferably made of a polymer material that includes a main chain, an atomic group having a bond that is selectively cut when exposed to an actinic ray, and a side chain that is bonded to the main chain by way of the atomic group. The polymer material with the side chain is preferably able to give a pretilt angle of greater than 85 degrees but 90 degrees or less to liquid crystal molecules. The polymer material without the side chain is preferably able to give a pretilt angle of 2 degrees to 15 degrees to the liquid crystal molecules.

Yet another preferred embodiment of the present invention provides another material of a liquid crystal alignment film. The material is preferably made of a polymer material that includes a main chain, an atomic group having a bond that is selectively cut when exposed to an actinic ray, and a side chain that is bonded to the main chain by way of the atomic group. The atomic group preferably includes at least one compound that is selected from the group consisting of benzoyl peroxide, benzoyl ether and derivatives thereof.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

The present inventors acquired the basic idea of the present invention by observing how the structure and alignment properties of an alignment film changed upon the exposure to an actinic ray.

Specifically, when a conventional vertical alignment film is exposed to a deep UV ray, the side chains thereof having vertical alignment properties are broken and the main chain thereof having horizontal alignment properties is also damaged, thereby changing the structure of the alignment film significantly. As a result, the horizontal alignment properties are seriously disturbed. For example, the pretilt angle sometimes cannot be controlled accurately anymore and may decrease to less than 2 degrees. Consequently, in that case, the voltage at which the orientation state of the liquid crystal molecules changes and the amount of time for making such a change are no longer controllable or the orientation state of some liquid crystal molecules at one location may be different from that of other liquid crystal molecules at another location.

Figure 1:
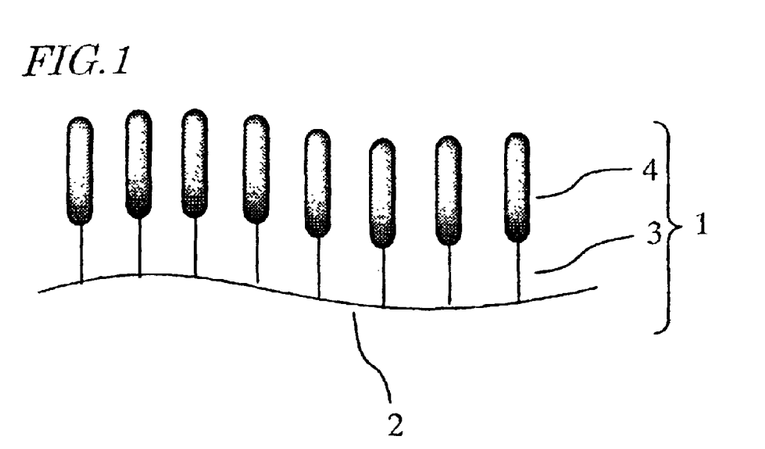
FIG. 1 schematically illustrates the structure of an alignment film material for use in a preferred embodiment of the present invention.

In contrast, a liquid crystal alignment film material according to a preferred embodiment of the present invention is a polymer material 1 having a structure such as that schematically shown in FIG. 1.

As shown in FIG. 1, the polymer material 1 includes a main chain 2, atomic groups 3 each having a bond that is selectively cut when exposed to an actinic ray, and side chains 4 that are bonded to the main chain 2 by way of the atomic groups 3. The atomic groups 3 will be herein sometimes referred to as "spacers" and the bonds of the spacers will be herein sometimes referred to as "spacer bonds".

The main chain 2 has a property of aligning liquid crystal molecules horizontally and may have the same skeleton (e.g., polyimide skeleton and polyvinyl alcohol) as a polymer material that is used as a known horizontal alignment material. The side chains 4 have a property of aligning the liquid crystal molecules vertically and may be the side chains (e.g., alkyl chains or alkyl chains replaced with fluorine) of a polymer material that is used as a known vertical alignment material. The polymer material 1 with the side chains 4 on has a property of giving a pretilt angle of greater than 85 degrees but 90 degrees or less to the liquid crystal molecules. On the other hand, the polymer material 1 without the side chains 4 has a property of giving a pretilt angle of 2 degrees to 15 degrees to the liquid crystal molecules.

By exposing the polymer material 1 to an actinic ray, the spacer bonds can be selectively cut and the side chains 4 can be separated from the main chain 2. As used herein, the "selectively" cut spacer bonds mean the spacer bonds that are cut "selectively" with respect to the bonds that constitute the main chain 2. Even if not only the spacer bonds but also some of the bonds of the side chains 4 are cut upon the exposure to an actinic ray, the polymer material 1 still can give a predetermined pretilt angle to the liquid crystal molecules unless the bonds included in the main chain 2 are cut. Thus, no instability will be created in the orientation properties.

In a preferred embodiment of the present invention, the spacer bonds of the polymer material are selectively cut by exposing the material to an actinic ray. Alternatively, heat or chemical reaction may also be utilized instead of the exposure to the actinic ray. However, when an actinic ray is used, it is easier to selectively separate and remove the side chains 4 of the polymer material 1 from a particular portion of the alignment film on the substrate as compared with the method of utilizing heat or chemical reaction. Thus, the method of this preferred embodiment can increase the throughput of liquid crystal display devices advantageously.

Figure 2:
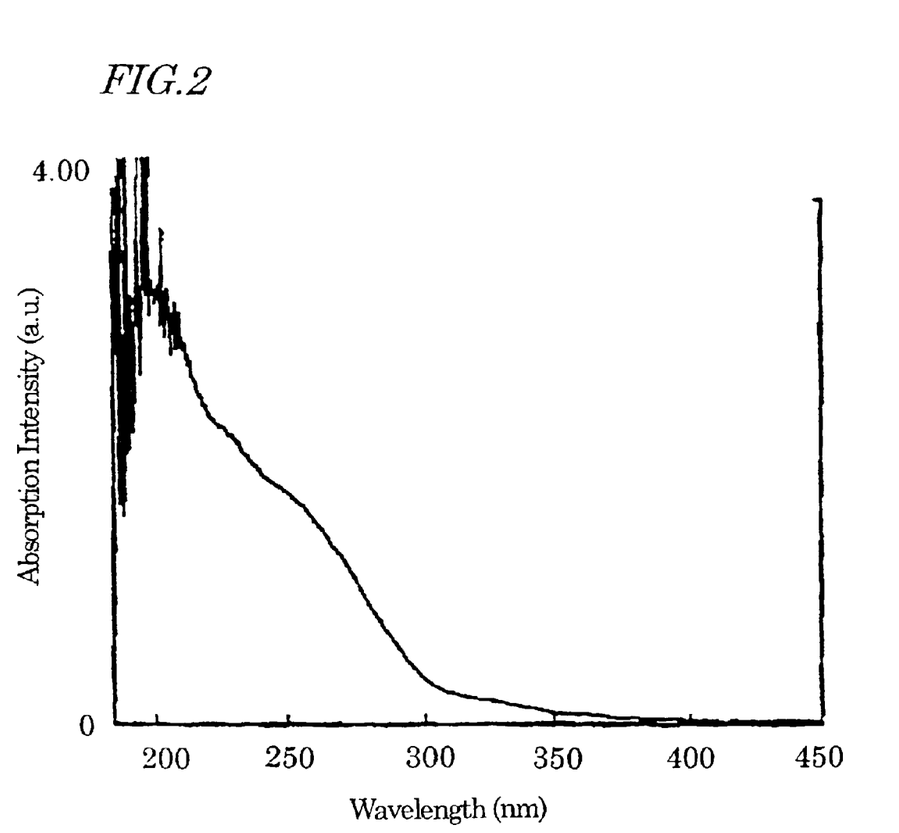
FIG. 2 is a graph showing the absorption spectrum of a polyimide-based alignment film material having horizontal alignment properties.

FIG. 2 shows the absorption spectrum of polyimide as a material for a conventional horizontal alignment film. As can be seen from this spectrum, the absorption of a radiation into polyimide is very weak in a wavelength range exceeding 300 nm. That is to say, polyimide is transparent and chemically stable with respect to a radiation that falls within the wavelength range of 300 nm to 450 nm. Accordingly, if the spacers 3 used include spacer bonds that are cut when exposed to a radiation that falls within the wavelength range of 300 nm to 450 nm, then the spacer bonds can be dissociated selectively. Also, to achieve sufficient reliability for the resultant alignment film, the alignment film should preferably be as stabilized as possible with respect to visible radiation. Also, to reduce the damage that could be done on the main chain, the actinic ray should preferably be a radiation with low energy. In view of these considerations, the actinic ray to be used is preferably a radiation that falls within the wavelength range of 350 nm to less than 400 nm.

That is to say, the spacer bonds are preferably cut selectively when exposed to a radiation that falls within this range and yet not cut when exposed to visible radiation that falls within the range of 400 nm to 800 nm. Examples of preferred spacers of this type include a benzoyl peroxide group and a benzoyl ether group. Alternatively, a derivative of benzoyl peroxide or a derivative of benzoyl ether may also be used.

In a preferred embodiment of the present invention, the alignment film may be formed of the liquid crystal alignment film material described above through the known process that is carried out on the conventional alignment film material. For example, the liquid crystal alignment film material may be applied as a solution onto the substrate and then subjected to a desired heat treatment process so as to form an alignment film. When the alignment film material has a polyimide skeleton, a thermoplastic polyimide may be used as the material. Alternatively, a polyamic acid, which is a precursor of polyimide, may be applied onto the substrate and then changed into polyimide through a heat treatment process.

A predetermined region of the alignment film that has been obtained in this manner is exposed to a radiation that falls within the wavelength range specified above, thereby selectively cutting the spacer bonds. Thereafter, the alignment film may be cleaned with a solvent, for example, thereby removing the side chains that have been cut from the main chain. If necessary, the alignment film may be further dried to eliminate the solvent.

In this manner, a low pretilt angle region, in which a pretilt angle of 2 degrees to 15 degrees is given to the liquid crystal molecules, is defined in a predetermined region of the alignment film. In this low pretilt angle region of the alignment film, the main chain of the alignment film material has not been damaged by the exposure to the actinic ray. Thus, the main chain of the alignment film material can exhibit its original alignment properties. As a result, in the low pretilt angle region of the alignment film, the predetermined pretilt angle is given to the liquid crystal molecules in a stabilized manner. On the other hand, the remaining region of the alignment film that has not been exposed to the actinic ray becomes a high pretilt angle region in which a pretilt angle of greater than 85 degrees but 90 degrees or less is given to the liquid crystal molecules.

Figure 3:
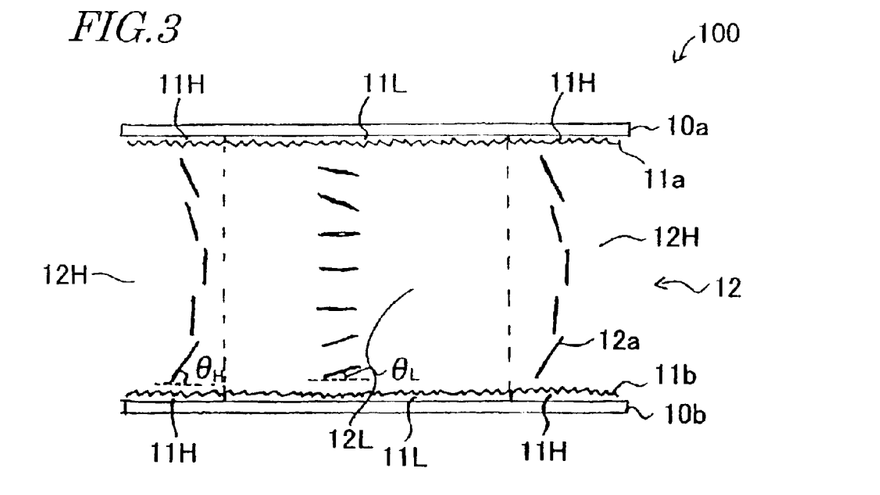
FIG. 3 is a cross-sectional view schematically illustrating the structure of an OCB-mode LCD 100 according to a preferred embodiment of the present invention.

If the liquid crystal alignment film material described above is used, an OCB-mode LCD 100 such as that shown in FIG. 3 may be fabricated.

As shown in FIG. 3, the LCD 100 includes two substrates 10a and 10b, a liquid crystal layer 12 that is sandwiched between the substrates 10a and 10b, and two alignment films 11a and 11b that are provided on the inside surfaces of the substrates 10a and 10b, respectively, so as to face the liquid crystal layer 12. The LCD 100 defines multiple picture elements. A portion of the LCD 100 corresponding to just one of the picture elements is schematically illustrated in FIG. 3. The substrates 10a and 10b may be known color filter substrates or active-matrix substrates, for example. Although not shown in FIG. 3, these substrates 10a and 10b may include electrodes for applying a voltage to the liquid crystal layer 12, interconnection lines for supplying the voltage to the electrodes, switching elements such as TFTs or MIMs, and a color filter layer for use in a color display operation if necessary.

Each of the alignment films 11a and 11b is made of the polymer material described above that includes a main chain, atomic groups having bonds that are selectively cut when exposed to an actinic ray, and side chains that are bonded to the main chain by way of the atomic groups. As shown in FIG. 3, each alignment film 11a or 11b includes a low pretilt angle region 11L that is made of the polymer material without the side chains and a high pretilt angle region 11H that is made of the polymer material with the side chains on. Each low pretilt angle region 11L is provided for associated one of the picture elements. On the other hand, each high pretilt angle region 11H is provided outside of its associated picture element, e.g., so as to surround the low pretilt angle region 11L.

The polymer material in the low pretilt angle region 11L gives a pretilt angle θL of 2 degrees to 15 degrees to the liquid crystal molecules 12a. On the other hand, the polymer material in the high pretilt angle region 11H gives a pretilt angle θH of greater than 85 degrees but 90 degrees or less to the liquid crystal molecules 12a.

The pretilt direction that is defined by the alignment film 11a for the liquid crystal molecules 12a is the same as that defined by the alignment film 11b for the liquid crystal molecules 12a. That is to say, a homogeneous alignment state is created. The pretilt direction is defined by a rubbing treatment, for example. Accordingly, by bonding the substrates 10a and 10b together so that their rubbing directions are parallel to each other, a homogeneous cell can be formed. The substrates 10a and 10b are also bonded together so that the high pretilt angle regions 11H of the alignment films 11a and 11b face each other and that the low pretilt angle regions 11L of the alignment films 11a and 11b also face each other.

While no voltage is being applied to the liquid crystal layer 12, the liquid crystal molecules 12a, which are located in a first region 12H of the liquid crystal layer 12 between the high pretilt angle regions 11H, exhibit a bend orientation state, while the liquid crystal molecules 12a, which are located in a second region 12L of the liquid crystal layer 12 between the low pretilt angle regions 11L, exhibit a splay orientation state. On the other hand, when a voltage of Vcr or more is applied to the second region 12L of the liquid crystal layer 12, the liquid crystal molecules 12a in the second region 12L change from the splay orientation state into the bend orientation state. At this point in time, the liquid crystal molecules 12a, existing in the first region 12H that surrounds the second region 12L, exhibit the bend orientation state. Accordingly, the liquid crystal molecules 12a existing in the second region 12L change into the bend orientation state smoothly as being affected by the liquid crystal molecules 12a in the first region 12H. As a result, in every picture element of the LCD 100, the liquid crystal molecules 12a in the liquid crystal layer 12 change into the bend orientation state uniformly and smoothly.

That is to say, the LCD 100 according to this preferred embodiment of the present invention can operate much more stably, and can exhibit far better performance, than the LCD described in Japanese Patent Application No. 2000-107910 identified above. To realize an LCD 100 with such excellent performance, the low pretilt angle region 11L preferably defines a pretilt angle θL of 2 degrees to 15 degrees (more preferably 6 degrees to 10 degrees) while the high pretilt angle region 11H preferably defines a pretilt angle θH of greater than 85 degrees but 90 degrees or less.

In an HAN-mode LCD according to this preferred embodiment of the present invention, two alignment films, which are provided so as to sandwich a liquid crystal layer between them, are also made of the alignment film material described above. One of the alignment films has a high pretilt angle region while the other alignment film has a low pretilt angle region. The liquid crystal layer includes a region which is located between the high and low pretilt angle regions of the alignment films and in which liquid crystal molecules exhibit a hybrid orientation state. The hybrid orientation region may be formed so as to correspond to at least one picture element. In a typical application, however, almost the entire surface of one alignment film defines the high pretilt angle region while almost the entire surface of the other alignment film defines the low pretilt angle region. That is to say, two films of the alignment film material may be formed on the inside surfaces of two substrates, one of the two films may be almost entirely exposed to an actinic ray at a predetermined wavelength and then the side chains may be removed from the alignment film material. Then, a pair of alignment films that defines the hybrid alignment region can be obtained.

These two alignment films are made of the same alignment film material. Accordingly, a decreased DC offset voltage is generated when the LCD is started, thus minimizing the image persistence phenomenon. Furthermore, the side chains are selectively removed from the alignment film material and no damage is done on the main chain. Thus, the low pretilt angle region has stabilized alignment properties and an HAN-mode LCD with excellent performance can be obtained.

The alignment film material according to the preferred embodiment of the present invention may be used to form not just a liquid crystal display device of the type including the high and low pretilt angle regions such as the OCB-mode LCD and HAN-mode LCD described above but also other types of optical elements.

For example, the alignment film material may be used to make an optical element including a birefringence medium layer (e.g., a phase plate or a selective reflector). If alignment films made of the alignment film material described above are used in forming a birefringence medium layer which includes liquid crystal molecules and of which the birefringence is controlled by regulating the orientation state of the liquid crystal molecules, then the high and low pretilt angle regions may be formed in a stabilized manner. In addition, since the high and low pretilt angle regions can be selectively formed at any specified locations, a birefringence medium layer, having mutually different birefringences with respect to multiple picture elements, can be formed. The birefringence medium layer may be made of a mixture including a chiral nematic material and a photocurable resin.

Hereinafter, specific preferred embodiments of the present invention will be described. It should be noted that the present invention is in no way limited to the following illustrative preferred embodiments.

Embodiment 1

A polymer material, which includes a polyimide skeleton as its main chain with horizontal alignment properties and an alkyl group as its side chains with vertical alignment properties to be bonded to the main chain, is prepared as an alignment film material. The general molecular structure of this alignment film material is represented by the following Chemical Formula (1):

where X may be one of the five types of atomic groups represented by the following Chemical Formula (2) or a mixture (i.e., copolymer) thereof, and Y is an alkyl chain in this preferred embodiment. The alkyl chain Y is introduced for each repeating unit represented by Chemical Formula (1) (i.e., has an introduction percentage of 100%).

Three types of thermoplastic polyimide-based alignment film materials, which included a benzoyl ether group, a benzoyl peroxide group and an amide group as spacers that bonded the polyimide main chain and the alkyl side chains together, respectively, were prepared. The benzoyl ether group, the benzoyl peroxide group and the amide group are represented by the following Chemical Formulae (3), (4) and (5), respectively:

In this case, X1 and Y1 as represented by the following Chemical Formulae (6) and (7) were respectively used as X and Y of the alignment film material:

(7)

This alignment film material may be synthesized by a known method. In the following description of this first preferred embodiment, the three types of alignment film materials including the benzoyl ether group, the benzoyl peroxide group and the amide group as their respective spacers will be identified by Example 1, Example 2 and Comparative Example 1.

The three types of alignment film materials representing Examples 1 and 2 and Comparative Example 1 were dissolved in a solvent and then applied onto respective glass substrates. The solvent was removed at 30° C. by a reduced pressure method to obtain respective alignment films.

Next, a set of three types of alignment films on three substrates was each exposed to a radiation having wavelengths of 250 nm, 300 nm, 350 nm, 450 nm and 500 nm at radiation intensities of 6.0 J/cm$^2$, 4.0 J/cm$^2$, 2.0 J/cm$^2$, 0.5 J/cm$^2$ and 0.1 J/cm$^2$, respectively, for approximately 5 minutes. Another set of three types of alignment films on three substrates were not exposed to the radiation.

The exposed substrates were steam-washed with acetone to remove dissociated low-molecular compounds (i.e., the side chains that were cut) therefrom.

The alignment films on all of the substrates were subjected to a rubbing treatment.

Next, a pair of glass substrates, on each of which the alignment film of one of the three types was formed, was bonded together to obtain a homogeneous cell. Then, a liquid crystal material ZLI-4792 (produced by Merck & Co., Inc.) was injected into each cell.

The pretilt angles of liquid crystal molecules were estimated by a crystal rotation method for each of the samples that had been prepared in this manner. The results are shown in the following Table 1:

TABLE 1

|  | Example 1 | Example 2 | Comp. Example 1 |
|---|---|---|---|
| Main chain | Polyimide | Polyimide | Polyimide |
| Side chains | Alkyl group | Alkyl group | Alkyl group |
| Spacer atomic group | Benzoyl Ether group | Benzoyl peroxide group | Amide Group |
| 250 nm | 1.0° | 0.5° | 0.9° |
| 300 nm | 5.9° | 6.3° | 78.8° |
| 350 nm | 6.8° | 7.2° | 83.1° |
| 350 nm<, ≦450 nm | 8.5° | 8.6° | 84.2° |
| 500 nm | 83.6° | 82.7° | 84.9° |
| Non-exposed | 88.4° | 87.6° | 86.9° |

When exposed to no radiation, all of the samples representing Examples 1 and 2 and Comparative Example 1 had pretilt angles of greater than 85 degrees and exhibited good vertical alignment properties. When the alignment films of Examples 1 and 2 and Comparative Example 1 were exposed to a radiation having a wavelength of 250 nm, all of these samples had pretilt angles of 1 degree or less.

When exposed to a radiation having a wavelength of 300 nm or more, the sample representing Comparative Example 1 had a pretilt angle that barely decreased to about 80 degrees and could not provide horizontal alignment properties. On the other hand, when the samples representing Examples 1 and 2 were exposed to a radiation that fell within the wavelength range of 300 nm to 450 nm, the pretilt angles thereof were in the range of about 6 degrees to about 9 degrees. And when the samples representing Examples 1 and 2 were exposed to a radiation that fell within the wavelength range of 350 nm to 450 nm, the pretilt angles thereof were in the range of about 7 degrees to about 9 degrees. However, when exposed to a radiation having a wavelength of 500 nm or more, even the samples representing Examples 1 and 2 had pretilt angles of more than 80 degrees and could not provide horizontal alignment properties.

As can be seen from these results, when exposed to a radiation having a wavelength of 250 nm, not only the side chains but also the main chain of each alignment film material were decomposed to result in an excessively small pretilt angle irrespective of the type of the spacers. On the other hand, when exposed to a radiation falling within the wavelength range of 300 nm to 450 nm, the alignment film materials that used a benzoyl ether group and a benzoyl peroxide group as their spacers (i.e., Examples 1 and 2) exhibited good horizontal alignment properties. This is because only the spacer bonds should have been cut and because the side chains should have been removed selectively. However, even when the alignment film material that used an amide group as its spacers (i.e., Comparative Example 1) was exposed to the radiation falling within the wavelength range of 300 nm to 450 nm, the spacer bonds thereof were not cut and the material exhibited vertical alignment properties due to the action of its side chains. The same results were obtained when an ester group was used as the spacers. It should be noted that when exposed to a radiation having a wavelength of 500 nm, even the spacer bonds of the benzoyl ether group or benzoyl peroxide group were hardly cut and the alignment films maintained their vertical alignment properties.

Next, another preferred embodiment of the present invention will be described. In this preferred embodiment, an alignment film material, including a polyvinyl alcohol skeleton (represented by Chemical Formula (8)) as its main chain with horizontal alignment properties, was used.

(8)

Y: SIDE CHAIN

As in the preferred embodiment described above, alkyl chains were also used as the side chains Y and introduced at 100%. In this preferred embodiment, three types of alignment film materials, including a benzoyl ether group, a benzoyl peroxide group and an amide group as their spacers linking the main and side chains together, were prepared as Example 3, Example 4 and Comparative Example 2, respectively.

As in the preferred embodiment described above, samples for use to measure the pretilt angles were prepared by using these alignment film materials. In this preferred embodiment, however, the samples were exposed only to an ultraviolet ray having a wavelength of 350 nm for approximately 5 minutes. The pretilt angles of those samples were estimated by a crystal rotation method. The results are shown in the following Table 2:

TABLE 2

| | Main chain | Side Chains | Spacer Atomic Group | Pre-tilt Angle (non-UV-exposed) | Pre-tilt Angle (UV exposed) |
|---|---|---|---|---|---|
| Example 3 | Vinyl Alcohol | Alkyl Group | Benzoyl Ether Group | 88.1° | 2.1° |
| Example 4 | Vinyl Alcohol | Alkyl Group | Benzoyl Peroxide Group | 86.4° | 2.5° |
| Comparative Example 2 | Vinyl Alcohol | Alkyl Group | Amide group | 85.7° | 82.4° |

As can be seen from the results shown in Table 2, even when their main chain was polyvinyl alcohol, the alignment films, including a benzoyl ether group and a benzoyl peroxide group as their respective spacers, had their spacer bonds cut and had their side chains removed selectively upon the exposure to the ultraviolet ray having a wavelength of 350 nm. Thus, their main chain was hardly damaged. It should be noted, however, that polyvinyl alcohol is normally a material that creates a smaller pretilt angle than polyimide. Thus, a UV-exposed alignment film including the polyvinyl alcohol main chain has a pretilt angle of about 2 degrees.

On the other hand, the sample of the alignment film material including an amide group as its spacers (i.e., Comparative Example 2) had a hardly decreased pretilt angle and could not provide horizontal alignment properties even when exposed to the ultraviolet ray having the wavelength of 350 nm. That is to say, the same results as those of the alignment film material including a polyimide main chain (i.e., Comparative Example 1) were obtained.

Embodiment 2

Hereinafter, a second specific preferred embodiment of the present invention will be described. The second preferred embodiment relates to a liquid crystal display device that is fabricated by using the alignment film material according to any of the preferred embodiments of the present invention described above.

First, samples of the OCB-mode LCD shown in FIG. 3 were fabricated in the following manner as LCD 1, LCD 2, LCD 3 and LCD 4 representing two specific Examples 1 and 2 of the present invention and two Comparative Examples 1 and 2, respectively.

As for the LCD 1 representing Example 1, the alignment film material representing Example 2 of the first preferred embodiment described above (i.e., a polyimide-based alignment film material including benzoyl peroxide spacers) was used.

As for the LCD 2 representing Example 2, the alignment film material representing Example 4 of the first preferred embodiment described above (i.e., a polyvinyl alcohol-based alignment film material including benzoyl peroxide spacers) was used.

As for the LCD 3 representing Comparative Example 1, vertical alignment films JALS-204 (produced by JSR Corp. and including spacers with amide bonds) that defined a pretilt angle of about 90 degrees were used.

As for the LCD 4 representing Comparative Example 2, horizontal alignment films JALS-212 (produced by JSR Corp.) that defined a pretilt angle of about 7 degrees were used.

First, TFT substrates, on each of which pixel electrodes were arranged in matrix, and counter substrates were prepared in four pairs. These substrates were made by known methods. Next, alignment films were formed on the surfaces of these substrates by using the four types of alignment film materials for the four pairs of substrates, respectively.

Figure 4:
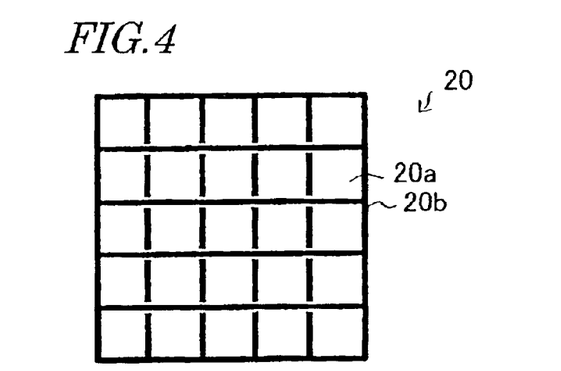
FIG. 4 is a plan view schematically illustrating a configuration for a photomask for use to fabricate the OCB-mode LCD 100 shown in FIG. 3.

Next, the alignment films on the substrates for the LCDs 1, 2 and 3 were exposed to an ultraviolet ray by using a photomask 20 such as that shown in FIG. 4. As shown in FIG. 4, the photomask 20 included multiple openings 20a corresponding to the pixels and opaque portions 20b that were provided to prevent the non-pixel portions from being exposed to the ultraviolet ray. Accordingly, by performing this exposure process, portions of each alignment film that corresponded to the respective pixels were exposed to the ultraviolet ray.

The alignment films on the substrates for the LCDs 1 and 2 were exposed to an ultraviolet ray having a wavelength of about 350 nm for 5 minutes.

Figure 5:
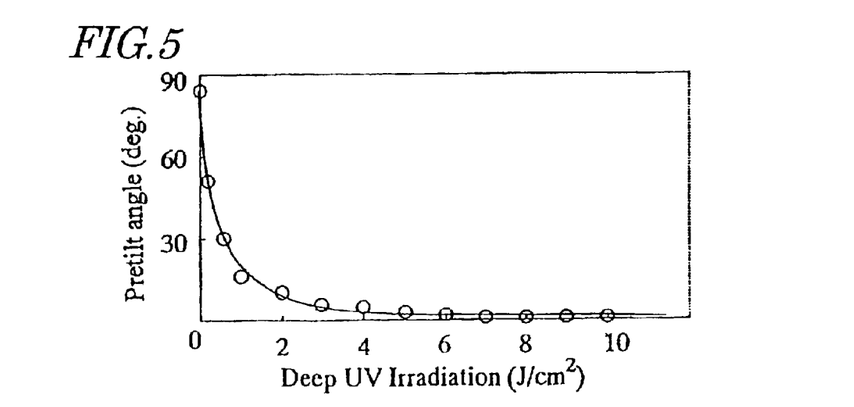
FIG. 5 is a graph showing the dependence of the pretilt angle on the radiation energy of a deep UV ray for a conventional vertical alignment film.

Even when the alignment films on the substrates for the LCD 3 were exposed to the ultraviolet ray having a wavelength of about 350 nm for 5 minutes, the resultant pretilt angle did not change. Accordingly, the present inventors analyzed the relationship between the radiation energy (J/cm$^2$) and the pretilt angle by using a deep UV ray having a wavelength of 250 nm. As a result, the present inventors discovered that the higher the radiation energy, the lower the pretilt angle as shown in FIG. 5. By reference to this result, the alignment films on the substrates for the LCD 3 were exposed to a deep UV ray having a wavelength of about 250 nm at an intensity of 6 J/cm$^2$ so as to define a pretilt angle of about 7 degrees.

The alignment films on the substrates for the LCD 4 were not exposed to any ultraviolet ray.

Next, the alignment films on all of the substrates were subjected to a rubbing treatment. Plastic beads having a diameter of 6.5 µm were scattered over the TFT substrates, which were then bonded to their counter substrates to define a homogeneous alignment state. A nematic liquid crystal material ZLI-4792 (produced by Merck & Co., Ltd.) was injected by a vacuum injection technique into each of the liquid crystal cells obtained and then the injection hole was sealed with a UV-curable resin.

The OCB-mode LCDs 1, 2, 3 and 4, including the four types of alignment films, respectively, were formed in this manner. The bend transition voltages Vcr and transition times of these LCDs 1, 2, 3 and 4 were estimated. The results are shown in the following Table 3. The pretilt angles in their respective display areas (corresponding to the pixels) were estimated by a crystal rotation method and the results are also shown in the following Table 3:

TABLE 3

| | Pre-tilt angle in Pixel regions (degrees) | Bend Transition Voltage (V) | Bend Transition Time (minutes) |
|---|---|---|---|
| LCD 1 | 6.8 | 1.3 | 3 |
| LCD 2 | 2.2 | 2.1 | 5 |
| LCD 3 | 7.1 | No transition | — |
| LCD 4 | 7.5 | 1.4 | 6 |

No bend transition was observed in the LCD 3 that used the vertical alignment film material until the voltage applied reached 15 V. Meanwhile, in the LCDs 1, 2 and 4, their liquid crystal molecules changed into the bend orientation state at applied voltages of 1.3 V, 2.1 V and 1.4 V, respectively, as shown in Table 3.

The LCD 3 that used the conventional vertical alignment film material had a pretilt angle of 7.1 degrees in the pixels regions (that were exposed to the ultraviolet ray). Also, no bend transition occurred in the LCD 3 even though vertical alignment regions existed around the pixel regions. The reasons are believed to be as follows.

Figure 6:
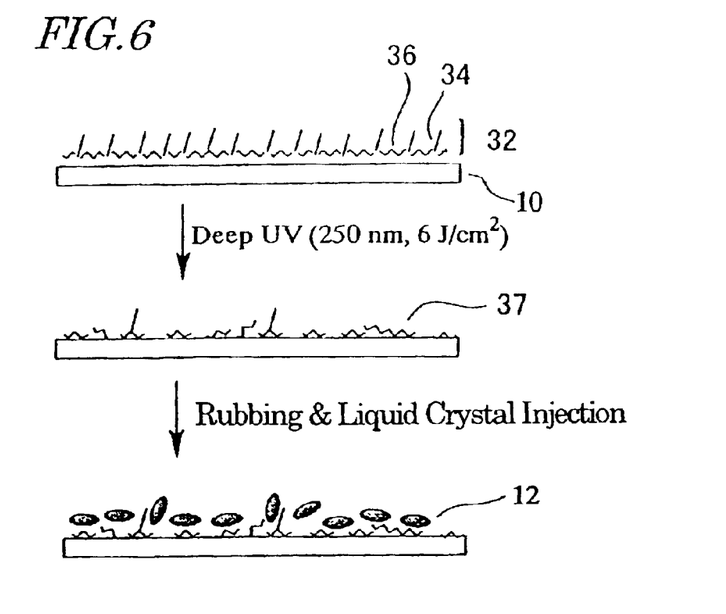
FIG. 6 schematically illustrates how the structure of the conventional vertical alignment film and the orientation state of liquid crystal molecules change upon the exposure to a deep UV ray.

As schematically illustrated in FIG. 6A, when the vertical alignment film material 32 is exposed to the deep UV ray, not only the side chain alkyl groups 34 thereof are removed but also portions of its main chain 36 are decomposed. As a result, a majority of the alignment film defines an extremely small pretilt angle of about 1 degree and just a portion of the alignment film is a vertical alignment region. Thus, the majority of the alignment films defining the extremely small pretilt angle could not have caused the bend transition. The pretilt angle of the pixel regions of the LCD 3 measured 7.1 degrees, which should be an average between the pretilt angle of about 1 degree of the low pretilt angle regions and that of the vertical alignment regions.

On the other hand, the pixel regions of the LCD 4 that used the horizontal alignment film had a pretilt angle of 7.5 degrees. Even though no vertical alignment regions were formed in the LCD 4, the bend transition still occurred in the LCD 4.

The LCD 1 defined a pretilt angle of 6.8 degrees, which was smaller than that of the LCD 4. However, since the vertical alignment regions existed in the LCD 1 as cores of bend transition, a complete bend transition occurred in the LCD 1 at a lower voltage applied and in a short time as compared to the LCD 4.

The LCD 2 defined a pretilt angle of as small as 2.2 degrees in its display area. However, since the pretilt angles were uniform over the entire pixel regions, the bend transition should have occurred in the LCD 2.

These results revealed that to make the liquid crystal molecules change into the bend orientation state smoothly and uniformly, it is important to control the pretilt angle accurately by preventing the main chain of the alignment film material from being decomposed.

It can be seen that the LCDs 1 and 2 representing specific examples of preferred embodiments of the present invention can make their liquid crystal molecules change into the bend orientation state at a relatively low voltage applied and in a relatively short time and can exhibit excellent performance.

Next, samples of the HAN-mode LCD shown in FIG. 8 were fabricated in the following manner as LCD 5, LCD 6, LCD 7 and LCD 8 representing another two specific Examples 3 and 4 of the present invention and two more Comparative Examples 3 and 4, respectively.

As for the LCD 5 representing Example 3, the alignment film material of Example 2 of the first preferred embodiment described above (i.e., a polyimide-based alignment film material including benzoyl peroxide spacers) was used. The alignment film on one of the two substrates was exposed to an ultraviolet ray having a wavelength of 350 nm for 5 minutes.

As for the LCD 6 representing Example 4, the alignment film material of Example 4 of the first preferred embodiment described above (i.e., a polyvinyl alcohol-based alignment film material including benzoyl peroxide spacers) was used. The alignment film on one of the two substrates was also exposed to an ultraviolet ray having a wavelength of 350 nm for 5 minutes.

As for the LCD 7 representing Comparative Example 3, vertical alignment films JALS-204 (produced by JSR Corp.) were used. The alignment film on one of the two substrates was exposed to an ultraviolet ray having a wavelength of 250 nm at an intensity of 6 J/cm$^2$.

As for the LCD 8 representing Comparative Example 4, a horizontal alignment film JALS-212 (produced by JSR Corp.) and a vertical alignment film JALS-204 (produced by JSR Corp.) were used.

In this manner, four types of HAN-mode LCDs 5, 6, 7 and 8 were fabricated and the DC offset voltages thereof were estimated at 25° C. by a flicker erasure technique. The results are shown in the following Table 4:

TABLE 4

|  | DC offset voltage (V) |
| --- | --- |
| LCD 5 | 0.22 |
| LCD 6 | 0.21 |
| LCD 7 | 0.35 |
| LCD 8 | 1.05 |

In the LCD 8 that used the two types of alignment film materials, ions were easily attracted toward, and charges were easily stored in, one of these films due to the difference in composition between these films or the difference in surface energy. As a result, a DC offset voltage of 1.05 V, causing the image persistence phenomenon, was generated.

In the LCD 7 on the other hand, the alignment films were made of the same material. Thus, a much smaller quantity of charge was stored and the DC offset voltage decreased to 0.35 V.

Furthermore, in the LCDs 5 and 6 representing specific examples of preferred embodiments of the present invention, the DC offset voltages further decreased to 0.22 V and 0.21 V, respectively.

As can be seen, when a benzoyl peroxide group was used as spacers, the horizontal alignment was realized by exposing the alignment film to an ultraviolet ray that had a lower energy than that of the ultraviolet ray to be irradiated on the conventional vertical alignment film. Thus, the main chain should not have been damaged so much and the offset voltages should have further decreased as compared to the LCD 7. In addition, in the LCDs 5 and 6, little damage was done on the main chain and therefore the pretilt angles in the horizontal alignment regions were stabilized as compared to the LCD 7.

Thus, the present inventors discovered that the DC offset voltage can be effectively decreased in the HAN mode by the method in which alignment films of the same material are formed on a pair of substrates and in which the pretilt angle is controlled by exposing the alignment films to an ultraviolet ray. The present inventors also discovered that the lower the energy of the ultraviolet ray, the lower the offset voltage should be.

In a liquid crystal alignment film material according to any of various preferred embodiments of the present invention described above, the side chains of a vertical alignment film can be removed selectively and yet the main chain thereof is hardly damaged when the material is exposed to an actinic ray. Thus, it is possible to form a high pretilt angle region and a low pretilt angle region in a stabilized manner and with high efficiency.

Also, the present invention improves the performance, and increases the productivity, of a liquid crystal display device of the type including a high pretilt angle region (vertical alignment region) and a low pretilt angle region (horizontal alignment region) such as an OCB-mode LCD or an HAN-mode LCD. Furthermore, the present invention also improves the performance, and increases the productivity, of an optical element (e.g., a phase plate), not just such a liquid crystal display device.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A liquid crystal display device comprising: two substrates; a liquid crystal layer that is sandwiched between the two substrates; and two alignment films, each of the two alignment films being provided on one surface of one associated substrate so as to face the liquid crystal layer, the liquid crystal display device defining multiple picture elements, wherein at least one of the two alignment films is made of a polymer material, the polymer material including: a main chain; an atomic group having a bond that is selectively cut when exposed to an actinic ray; and a side chain that is bonded to the main chain by way of the atomic group, wherein the polymer material with the side chain gives a pretilt angle of greater than 85 degrees but 90 degrees or less to the liquid crystal molecules of the liquid crystal layer, wherein the polymer material without the side chain gives a pretilt angle of 2 degrees to 15 degrees to the liquid crystal molecules of the liquid crystal layer; and wherein the atomic group comprises a benzoyl group.

2. The device of claim 1, wherein at least one of the two alignment films includes a low pretilt angle region that is made of the polymer material without the side chain.

3. The device of claim 2, wherein the at least one alignment film further includes a high pretilt angle region that is made of the polymer material with the side chain.

4. The device of claim 3, wherein each of the two alignment films includes the high pretilt angle region and the low pretilt angle region, and wherein the liquid crystal layer includes: a bend region, which is located between the high pretilt angle regions of the alignment films and in which the liquid crystal molecules exhibit a bend orientation state while no voltage is applied thereto; and a splay region, which is located between the low pretilt angle regions of the alignment films and in which the liquid crystal molecules exhibit a splay orientation state while no voltage is applied thereto, and wherein the liquid crystal display device conducts a display operation by utilizing the bend orientation state.

5. The device of claim 3, wherein one of the two alignment films includes the high pretilt angle region and the other alignment film includes the low pretilt angle region, and wherein the liquid crystal layer includes a hybrid region, which is located between the high and low pretilt angle regions of the two alignment films and in which the liquid crystal molecules exhibit a hybrid orientation state, and wherein the liquid crystal display device conducts a display operation in a hybridized aligned nematic mode.

6. The device of claim 1, wherein the bond of the atomic group is cut when exposed to a radiation that falls within the wavelength range of 300 nm to 450 nm.

7. The device of claim 6, wherein the atomic group includes at least one compound that is selected from the group consisting of benzoyl peroxide, benzoyl ether and derivatives thereof.

8. A method of fabricating a liquid crystal display device, the device including two substrates; a liquid crystal layer that is sandwiched between the two substrates; and two alignment films, each of the two alignment films being provided on one surface of one associated substrate so as to face the liquid crystal layer, the liquid crystal display device defining multiple picture elements, the method comprising the steps of:

(a) preparing the two substrates;

(b) forming at least one of the two alignment materials of a polymer material on the surface of at least one of the two substrates, the polymer material including: a main chain; an atomic group having a bond that is selectively cut when exposed to an actinic ray; and a side chain that is bonded to the main chain by way of the atomic group, wherein the polymer material with the side chain gives a pretilt angle of greater than 85 degrees but 90 degrees or less to liquid crystal molecules of the liquid crystal layer; and wherein the atomic group comprises a benzoyl group;

(c) exposing at least one region of the aligmnent film to the actinic ray, thereby cutting the bond of the atomic group of the polymer material in the at least one region and removing the side chain; and (d) forming the liquid crystal layer that includes liquid crystal molecules to which a pretilt angle of 2 degrees to 15 degrees have been given by the at least one region of the alignment film.

9. The method of claim 8, wherein the step (c) includes the step of exposing selected regions of the alignment film, which are to define the multiple picture elements, to the actinic ray, and wherein the step (d) includes the step of forming the liquid crystal layer that includes liquid crystal molecules to which a pretilt angle of greater than 85 degrees but 90 degrees or less has been given by the other non-selected regions of the alignment film that have not been exposed to the actinic ray.

10. The method of claim 8, wherein the step (c) includes the step of exposing the at least one region to a radiation that falls within the wavelength range of 300 nm to 450 nm.

11. The method of claim 8, wherein the atomic group includes at least one compound that is selected from the group consisting of benzoyl peroxide, benzoyl ether and derivatives thereof.

12. An optical element comprising two alignment films and a birefringence medium layer that is sandwiched between the two alignment films, wherein the birefringence medium layer includes liquid crystal molecules of which the orientation is regulated by the two alignment films, and wherein at least one of the two alignment films is made of a polymer material, the polymer material including: a main chain; an atomic group having a bond that is selectively cut when exposed to an actinic ray; and a side chain that is bonded to the main chain by way of the atomic group, wherein the polymer material with the side chain gives a pretilt angle of greater than 85 degrees but 90 degrees or less to the liquid crystal molecules of the birefringence medium layer, wherein the polymer material without the side chain gives a pretilt angle of 2 degrees to 15 degrees to the liquid crystal molecules of the birefringence medium layer; and wherein the atomic groupcomprises a benzoyl group.

13. The element of claim 12, wherein at least one of the two alignment films includes a low pretilt angle region that is made of the polymer material without the side chain.

14. The element of claim 13, wherein the at least one alignment film further includes a high pretilt angle region that is made of the polymer material with the side chain.

15. The element of claim 14, wherein each of the two alignment films includes the high pretilt angle region and the low pretilt angle region, and wherein the birefringence medium layer includes: a first region that is located between the high pretilt angle regions of the alignment films; and a second region that is located between the low pretilt angle regions of the alignment films, the first and second regions having mutually different retardations.

16. A method of making an optical element, the optical element including two alignment films and a birefringence medium layer, comprising liquid crystal molecules, that is sandwiched between the two alignment films, the method comprising the steps of:

(a) forming at least one of the two alignment films of a polymer material, the polymer material including: a main chain; an atomic group having a bond that is selectively cut when exposed to an actinic ray; and a side chain that is bonded to the main chain by way of the atomic group, wherein the polymer material with the side chain gives a pretilt angle of greater than 85 degrees but 90 degrees or less to the liquid crystal molecules of the bireflingence medium layer; and wherein the atomic group comprises a benzoyl group;

(b) exposing at least one region of the alignment film to the actinic ray, thereby cutting the bond of the atomic group of the polymer material in the at least one region and removing the side chain; and (c) forming the birefringence medium layer that includes the liquid crystal molecules to which a pretilt angle of 2 degrees to 15 degrees have been given by the at least one region of the alignment film.

17. The method of claim 16, wherein the step (b) includes the step of exposing selected regions of the alignment film to the actinic ray, and wherein the step (c) includes the step of forming the birefringence medium layer that includes liquid crystal molecules to which a pretilt angle of greater than 85 degrees but 90 degrees or less has been given by the other non-selected regions of the alignment film that have not been exposed to the actinic ray.

18. The method of claim 16, wherein the step (b) includes the step of exposing the at least one region to a radiation that falls within the wavelength range of 300 nm to 450 nm.

19. The method of one of claim 16, wherein the atomic group includes at least one compound that is selected from the group consisting of benzoyl peroxide, benzoyl ether and derivatives thereof.

20. A material of a liquid crystal alignment film, the material being made of a polymer material that includes: a main chain; an atomic group having a bond that is selectively cut when exposed to an actinic ray; and a side chain that is bonded to the main chain by way of the atomic group, wherein the polymer material with the side chain gives a pretilt angle of greater than 85 degrees but 90 degrees or less to liquid crystal molecules, wherein the polymer material without the side chain gives a pretilt angle of 2 degrees to 15 degrees to the liquid crystal molecules; and wherein the atomic group comprises a benzoyl group.

* * * * *